(12) United States Patent
Aizawa

(10) Patent No.: US 7,375,742 B2
(45) Date of Patent: May 20, 2008

(54) DIGITAL INFORMATION INPUT APPARATUS

(75) Inventor: Takashi Aizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 734 days.

(21) Appl. No.: 10/660,585

(22) Filed: Sep. 12, 2003

(65) Prior Publication Data

US 2004/0056846 A1 Mar. 25, 2004

(30) Foreign Application Priority Data

Sep. 20, 2002 (JP) ............... 2002-274825

(51) Int. Cl.
H04N 5/225 (2006.01)
H04N 5/76 (2006.01)
H04N 5/232 (2006.01)

(52) U.S. Cl. ............... 348/207.1; 348/231.1; 348/211.6

(58) Field of Classification Search ........... 348/211, 348/231.1, 231.2, 231.3, 231.6, 231.9, 207.99, 348/207.1, 231.99, 20, 7.1
See application file for complete search history.

(56) References Cited

U.S. PATENT DOCUMENTS 6,335,742 B1 * 1/2002 Takemoto ............ 715/781
6,452,629 B1 * 9/2002 Aizawa et al. ......... 348/231.99
6,567,122 B1 * 5/2003 Anderson et al. ........ 348/211.3
6,664,976 B2 * 12/2003 Lofgren et al. ............. 345/634
2002/0063781 A1 5/2002 Aizawa ...................... 348/211

* cited by examiner

Primary Examiner—David Ometz
Assistant Examiner—Tuan Le
(74) Attorney, Agent, or Firm—Fitzpatrick, Cella, Harper & Scinto

(57) ABSTRACT

If a request of handle information to identify data existing in a recording medium is made to a digital camera by a PC, the digital camera collects the data existing in the recording medium by accessing a file system, generates unique handle information independent of the file system on the basis of a file path of the file system, and transmits it to the PC. When the request accompanied by the handle information is received from the PC, the digital camera executes a file path restoring process to the handle information, thereby restoring the file path which depends on the file system in the digital camera, retrieves the requested file by using the obtained file path, and transmits the data to the PC. According to this arrangement, installation costs can be suppressed by making an identification information management table unnecessary even while identification information which is independent of a logical data management system is used.

18 Claims, 3 Drawing Sheets

DCIM¥100Canon¥IMG_0001.jpg

| 100Canon | 0x00001064 |
| --- | --- |
| img_0001.jpg | 0x10010000 |
| GENERATED HANDLE | 0x10011064 |

DCIM¥101TestA¥Snd_0003.wav

| 101TestA | 0x00001065 |
| --- | --- |
| Snd_0003.wav | 0x20030000 |
| GENERATED HANDLE | 0x20031065 |

DIGITAL INFORMATION INPUT APPARATUS

BACKGROUND OF THE INVENTION

1. Field of the Invention

The invention relates to a digital information input apparatus.

2. Related Background Art

A system such that image data of an object photographed by an information generating apparatus, such as a digital camera, video camera, or the like, is recorded in a recording medium existing in the information generating apparatus and transferred to an information processing apparatus, such as a personal computer (PC) or the like, has been realized as a product.

In such a system, in order to identify and operate the data recorded in the recording medium in the information generating apparatus, logical identification information of data storage (for example, a file name in the case where the data has been recorded as a file) is used or unique identification information (a handle, an ID, etc.) which can specify the data is used.

In the above technique, for example, in the case of operating the data with an external information processing apparatus by using the logical identification information such as a file name or the like, recorded in the recording medium in the information generating apparatus, knowledge of the logical identification information recorded in the recording medium in the information generating apparatus has to be understood in the external information processing apparatus and a file system or the like in the information generating apparatus has to be directly operated. In this case, if a logical data management system such as a file system or the like in the information generating apparatus is changed, it is also necessary to change processes in the external information processing apparatus.

In the case of supporting a plurality of kinds of information generating apparatuses having different file systems, the external information processing apparatus has to support logical data management systems such as different kinds of file systems or the like, resulting in an increase in installation costs.

As mentioned above, in the case of using the unique identification information (the handle, ID, etc.) which is independent of the logical data management systems such as file systems or the like of the information generating apparatus, the identification information which is independent of the logical data management system of the recording medium in the information generating apparatus is used. Therefore, even in the case of supporting a plurality of information generating apparatuses having different logical data management systems, since they can be equivalently handled by the external information processing apparatus, the installation costs are reduced. However, on the contrary, in the information generating apparatus, the unique identification information which is independent of the logical data management systems such as file systems or the like in the information generating apparatuses has to be generated and an identification information correspondence table for making the identification information of the logical data management systems such as file names or the like correspond to the generated unique identification information has to be held.

Generally, the identification information management table is stored in a work area such as a RAM or the like in the information generating apparatus and held while the information generating apparatus and the external information processing apparatus are communicating with each other. However, if a large amount of data objects exist in a storage medium existing in the information generating apparatus, a capacity of the work area such as a RAM which is necessary to construct the identification information management table increases, so that the installation costs of the information generating apparatus are increased.

SUMMARY OF THE INVENTION

The invention is made in consideration of the problems as mentioned above and it is an object of the invention to make an identification information management table unnecessary while using identification information which is independent of a logical data management system, thereby enabling installation costs to be reduced.

To accomplish the above object, according to a preferred embodiment of the invention, there is disclosed a digital information input system including an information generating apparatus for digitizing information and an information processing apparatus for collecting information and processing, storing, or managing the information, comprising: identification information generating means for generating second data identification information which is independent of a logical data management system existing in the information generating apparatus, in accordance with a predetermined rule on the basis of first data identification information which depends on the logical data management system existing in the information generating apparatus; and identification information restoring means for restoring the first data identification information in accordance with a predetermined rule on the basis of the second data identification information.

According to another preferred embodiment of the invention, there is disclosed an information generating apparatus for digitizing information and enabling the information to be transferred to an outside, comprising: identification information generating means for generating second data identification information which is independent of a logical data management system, in accordance with a predetermined rule on the basis of first data identification information which depends on the logical data management system existing in the information generating apparatus; and identification information restoring means for restoring the first data identification information in accordance with a predetermined rule on the basis of the second data identification information.

An information managing method and a processing program of the digital information input system arranged between the information generating apparatus and the information processing apparatus and a recording medium in which such a program has been stored are disclosed.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments of a digital information input system, an information generating apparatus, an information managing method, a program, and a computer-readable storage medium of the invention will be described hereinbelow with reference to the drawings.

Figure 1:
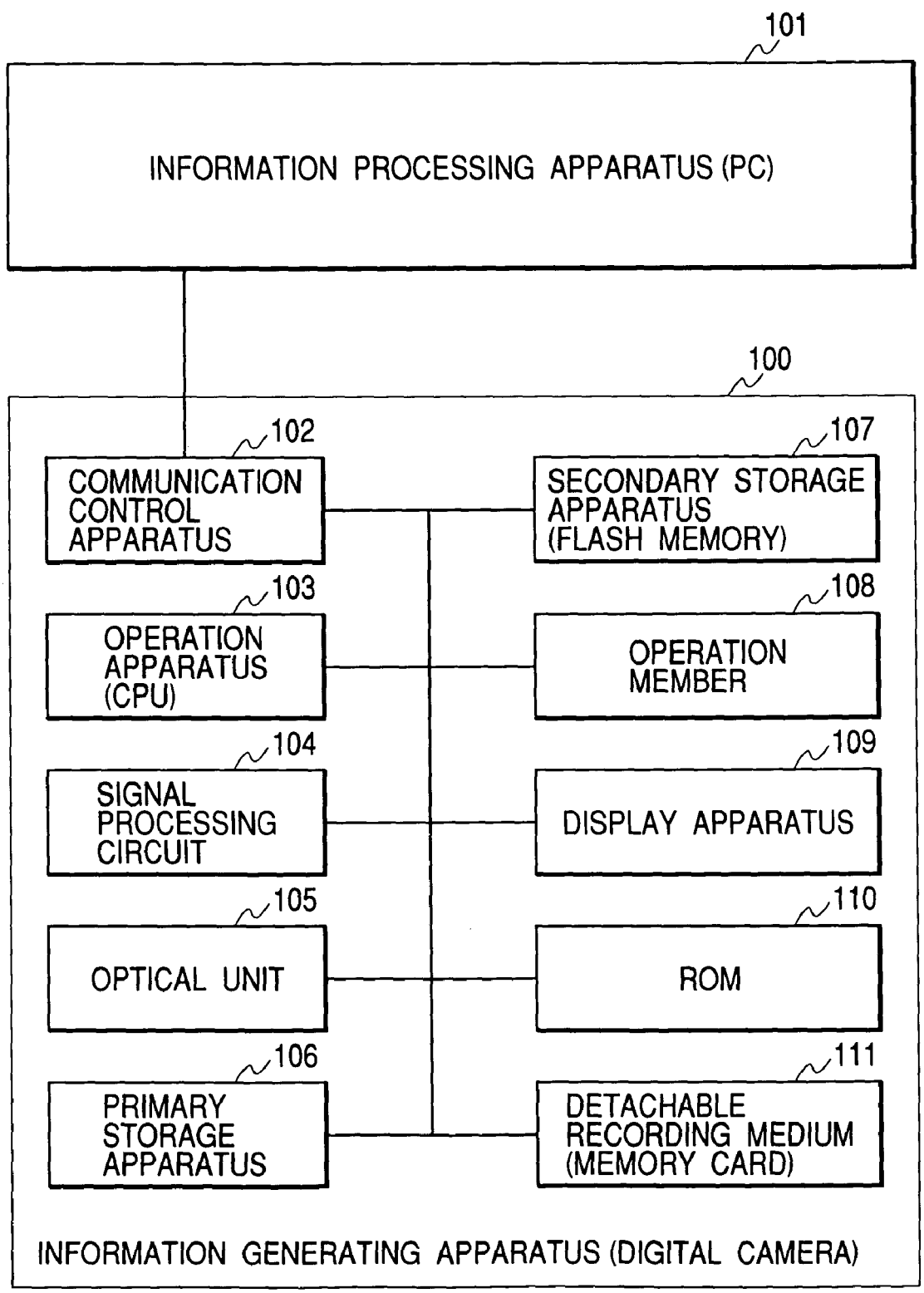
FIG. 1 is a block diagram showing a digital information input system of an embodiment.

FIG. 1 is a block diagram showing a digital information input system (digital camera system) according to an embodiment of the invention. In the embodiment, the digital information input system is mainly divided into: an information generating apparatus (hereinafter, referred to as a digital camera) 100 such as digital camera, digital video camera, or the like; and an information processing apparatus (hereinafter, referred to as a PC) 101 such as a personal computer or the like.

The digital camera 100 comprises: an optical unit 105 including a lens, a CCD, a driving circuit, and the like; a signal processing circuit 104 for processing image data or the like; an operation apparatus 103 such as a CPU or the like; a primary storage device 106 such as a DRAM or the like; a secondary storage device 107 such as a built-in flash ROM or the like; an operation member 108; a display apparatus 109 such as an LCD or the like; a read only memory 110 such as a ROM or the like which is used to store a program or the like; a detachable recording medium 111 such as a compact flash (registered trademark) memory card or the like; and a communication control apparatus 102 for managing a connection to the personal computer PC.

The digital camera can have only the detachable recording medium 111 in dependence on a kind of digital camera or only the undetachable secondary storage device 107 such as a built-in flash ROM or the like.

Although a cable connection such as a USB (Universal Serial Bus) or the like can be mentioned with respect to the communication control apparatus 102 for managing the connection to the PC 101, for example, another connection such as a wireless logical connection can be made.

Figure 2:
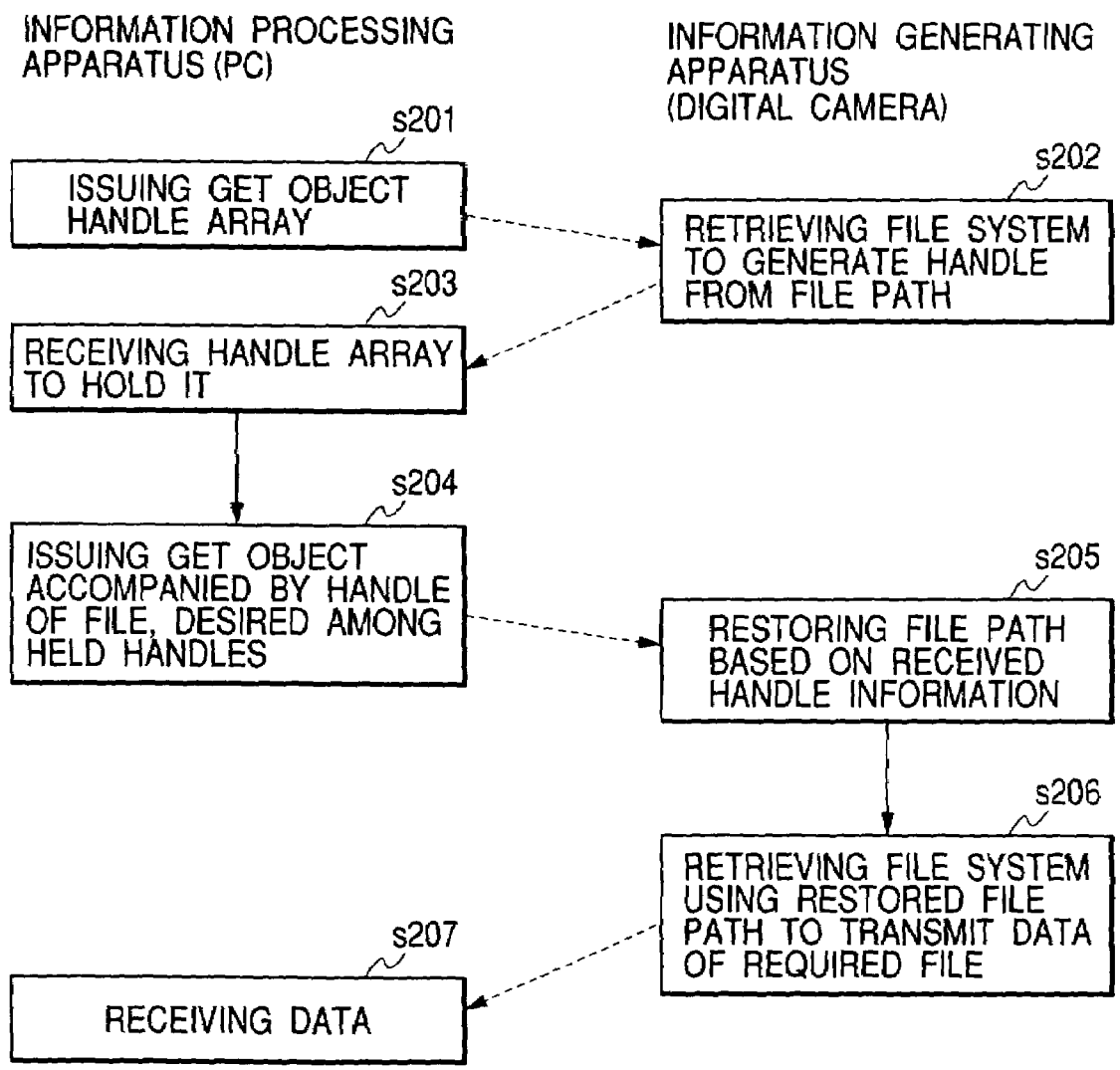
FIG. 2 is a flowchart for explaining an image data obtaining method.

An image data obtaining method which is used in the embodiment will be described with reference to FIG. 2. First, if it is intended to operate and refer to image data or the like recorded in the recording medium 111 in the digital camera 100, the PC 101 issues a Get Object Handle Array request to the digital camera 100 in order to request handle information for identifying the data existing in the recording medium 111 (step S201).

In response to such a request, the digital camera 100 collects the data existing in the recording medium 111 by accessing a file system, generates the handle information on the basis of a file path of the file system, and transmits it to the PC 101 (step S202). Details of the generation of the handle information will be described hereinlater. Thus, the handle information can be generated as unique information which is independent of the file system in the digital camera 100.

The PC 101 holds the received handle information therein (step S203). The PC 101 uses handle information of the data which the PC 101 wants to get, among the held handle information, as a parameter of a Get Object request to issue it to the digital camera 100 (step S204).

In response to such a request, the digital camera 100 executes a file path restoring process on the obtained handle information as will be explained hereinlater, thereby restoring the file path which depends on the file system in the digital camera 100 (step S205), retrieves the requested file by using the obtained file path, and transmits the data to the PC 101 (step S206) By receiving the data, the PC 101 can get the designated data (step S207).

Figures 3, 4A, 4B:
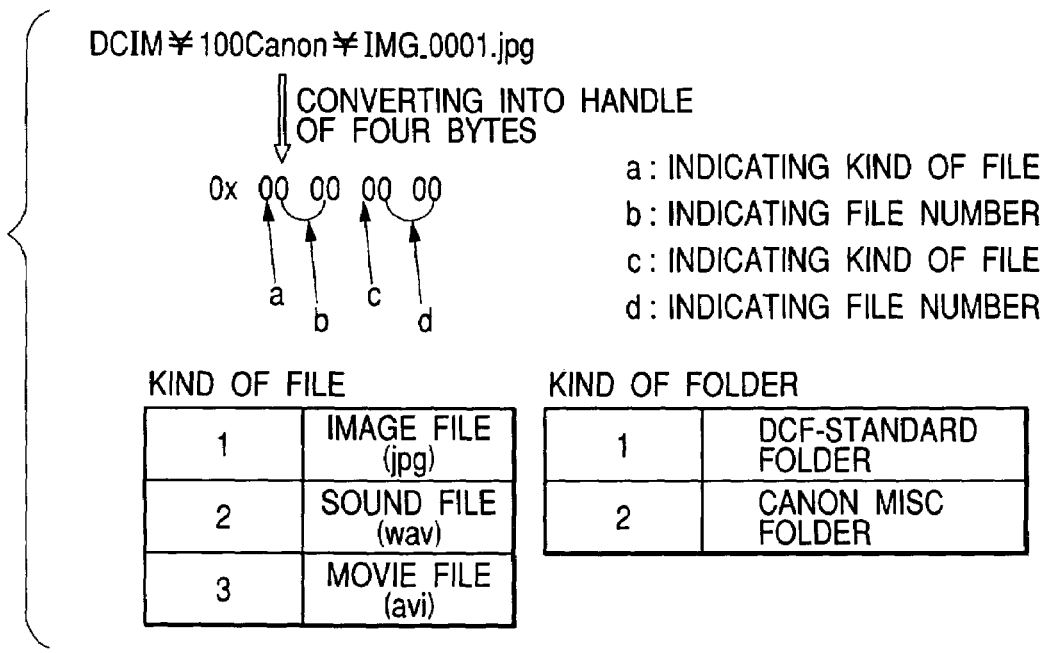
FIG. 3 is a diagram for explaining a concept of generation of handle information.
FIGS. 4A and 4B are diagrams for explaining specific examples of the generation of the handle information.

The generation of the handle information according to the embodiment will be described hereinbelow with reference to FIG. 3. FIG. 3 is a conceptual diagram. As shown in the diagram, in the embodiment, it is assumed as a prerequisite that the file system of the digital camera 100 is an FAT file system according to a DCF (Design Rule for Camera File System).

Fundamentally, the data which is handled by the digital camera 100 in the embodiment is data specified in the DCF and it is further assumed that an added data file which has newly been defined is also included. In other words, the embodiment is characterized in that all arbitrary data files existing in the recording medium 111 are not handled. It is because the more simplified handles can be realized by adding such a limitation, when the handle information is generated.

As shown in FIG. 3, in the embodiment, a file path name is converted into handle information of 4 bytes. Bits constructing the handle information of 4 bytes are separated as shown by a, b, c, and d in FIG. 3 and determined as follows: (a) a kind of file; (b) a file number; (c) a kind of folder; and (d) a folder number, respectively. The file path in the embodiment corresponds to first identification information in the invention and the handle information corresponds to second identification information in the invention.

As kinds of files, 1. ImageFile(jpg), 2. SoundFile(wav), and 3. MovieFile(avi) have previously been defined. As kinds of folders, 1. DCF-standard folder and 2. CanonMisc folder have previously been defined.

An explanation will be specifically made on the basis of examples shown in FIGS. 4A and 4B. FIGS. 4A and 4B show two examples. In the example shown in FIG. 4A, image data obtained by photographing an object by a general DCF-based digital camera called "DCIM¥100Canon¥IMG_0001.jpg" is handled. In this case, first, although a folder "DCIM" exists in a root of the recording medium, since only the files existing under DCIM are handled in the present embodiment as mentioned above, such information can be omitted when the handle is generated.

Therefore, the kind of folder and the folder number are determined on the basis of the folder name "100Canon". The folder number is set to 100 and the kind of folder is set to 1 because it indicates the DCF folder. A portion "Canon" added to the folder name is omitted when the handle is generated. It is because, since folders whose folder numbers are the same and subsequent portions of 5 characters are different are inhibited in the DCIM according to the DCF standard, even if the portion "Canon" does not exist, the folder can be unconditionally specified only by the folder number.

Such a folder number can be expressed by "00000064 h" as a hexadecimal number and the kind of folder can be expressed by "00001000 h" as a hexadecimal number.

Subsequently, with respect to the file, since the file number is equal to "0001" and the kind of file is equal to "ImageFile" in a manner similar to the above, the file number is expressed by bits "00010000 h" as a hexadecimal number and the kind of file is expressed by bits "10000000 h" as a hexadecimal number.

When the OR of that bit information is calculated, the handle information which is generated is expressed by "0x10011064".

Subsequently, the example shown in FIG. 4B will be described.

In this example, audio data "DCIM¥101TestA¥Snd_0003.wav" is handled. Also in this case, first, although the folder "DCIM" exists in the root of the recording medium, since only the files existing under DCIM are handled in the present embodiment as mentioned above, such information can be omitted when the handle is generated.

Therefore, the folder number can be expressed by "00000065 h" as a hexadecimal number and the kind of folder can be expressed by "00001000 h" as a hexadecimal number.

Subsequently, with respect to the file, since the file number is equal to "0003" and the kind of file is equal to "SoundFile" in a manner similar to the above, the file number is expressed by bits "00030000 h" as a hexadecimal number and the kind of file is expressed by bits "20000000 h" as a hexadecimal number.

When the OR of those bit information is calculated, "Handle" which is generated is expressed by "0x20031065".

Subsequently, restoration of a file path which is used in the present embodiment will be described. When the generated handle information is received from the PC 101, the digital camera 100 needs to restore the file path by which its own file system can be referred to.

The restoring method is executed in accordance with a flow opposite to that of the handle information generating method. First, the data of 4 bytes of the handle information is divided into the bit groups shown in FIG. 3 and the kind of file, the file number, the kind of folder, and the folder number are extracted from each bit group.

First, when the kind of folder indicates a DCF folder, the inside of the DCIM folder is retrieved by using the folder number and a folder in which the same symbols are provided in first three characters of the folder name is retrieved.

Subsequently, a file is specified by executing retrieval in the retrieved folder by using the file number and the kind of file.

By using the above method, the digital camera 100 can dynamically retrieve a predetermined file from its own file system by using the handle information received from the PC 101.

Other Embodiments

The invention also incorporates a case where in order to make various devices operative so as to realize the functions of the embodiments mentioned above, program codes of software to realize the functions of the embodiments are supplied to a computer in an apparatus or a system connected to the various devices and the various devices are made operative in accordance with a program stored in a computer (or a CPU or an MPU) of the system or the apparatus, thereby embodying the invention.

In this case, the program codes themselves of the above software realize the functions of the embodiments mentioned above and the program codes themselves construct the invention. As a transferring medium of the program codes, it is possible to use a communication medium (a wired line such as an optical fiber or the like, a wireless line, or the like) in a computer network (LAN, WAN such as an Internet or the like, a wireless communication network, etc.) system for supplying the program codes by transmitting program information as a carrier wave.

Further, means for supplying the program codes to the computer, for example, a recording medium in which the program codes have been stored, can realize the invention. As a computer-readable storage medium for storing the program codes, for example, a flexible disk, a hard disk, an optical disk, a magnetooptic disk, a CD-ROM, a magnetic tape, a non-volatile memory card, a ROM, or the like, can be used.

Naturally, the invention incorporates not only a case where a computer executes the supplied program codes, so that the functions of the embodiments mentioned above are realized but also a case where the program codes operate together with an OS (Operating System) which is operating in the computer or another application software or the like and the functions of the embodiments mentioned above are realized. In this case, the program codes are also naturally incorporated in the embodiments of the invention.

Further, naturally, the invention incorporates a case where the supplied program codes are stored into a memory provided for a function expanding board of a computer or a function expanding unit connected to a computer, thereafter, a CPU or the like provided for the function expanding board or the function expanding unit executes a part or all of actual processes on the basis of instructions of the program codes, and the functions of the embodiments mentioned above are realized by those processes.

The shape and structure of each portion shown in the embodiments are merely shown as examples at the time of embodying the invention and the technical purview of the invention should not be limitedly interpreted by them. That is, many modifications and variations are possible within the spirit and scope of the appended claims of the invention.

As mentioned above, the data recorded in the recording medium in the information generating apparatus can be operated by the external information processing apparatus by using the identification information which is independent of the logical data management system existing in the information generating apparatus. Moreover, the identification information correspondence table for making the identification information of the logical data management systems, such as file names or the like, correspond to the generated unique identification information does not need to be held in the information generating apparatus. The unique identification information can be converted into the identification information which depends on the logical data management system. Therefore, even if a large amount of data exists in the recording medium in the information generating apparatus, the information generating apparatus can be installed without consuming a large amount of resources, such as RAM and the like.

What is claimed is:

1. A digital information input system including an information generating apparatus for transferring information of a plurality of files to an outside and an information processing apparatus, comprising:

identification information generating means for generating handle information which is independent of a logical file management system existing in said information generating apparatus, on the basis of a data string of a file path which depends on the logical file management system; and identification information restoring means for restoring the file path on the basis of the handle information to uniquely specify each of the plurality of files in said information processing apparatus.

2. An information generating apparatus for transferring information of a plurality of files to an outside, comprising:

identification information generating means for generating handle information which is independent of a logical file management system existing in said information generating apparatus, on the basis of a data string of a file path which depends on the logical file management system; and identification information restoring means for restoring the file path on the basis of the handle information.

3. An apparatus according to claim 2, further comprising transmitting means for transmitting the handle information to the outside.

4. An apparatus according to claim 3, further comprising receiving means for receiving the handle information from the outside.

5. An apparatus according to claim 4, wherein the handle information is generated so as to include contents for specifying the plurality of files and specifying a storing location of the plurality of files in said logical file management system.

6. An apparatus according to claim 5, wherein the information generating apparatus is a digital camera or a digital video camera, wherein the plurality of files are a plurality of files of image data captured by the digital camera or the digital video camera.

7. An information managing method for a digital information input system including an information generating apparatus for transferring information of a plurality of files to an outside and an information processing apparatus, comprising the steps of:

generating handle information which is independent of a logical file management system existing in the information generating apparatus, on the basis of a data string of a file path which depends on the logical file management system; and restoring the file path on the basis of the handle information to uniquely specify each of the plurality of files in the information processing apparatus.

8. A computer-executable program stored in a computer-readable storage medium, comprising a program code causing a computer to control a digital information input system having an information generating apparatus for transferring information of a plurality of files to an outside and an information processing apparatus to perform a method of managing the information, the method comprising:

a process for generating handle information which is independent of a logical file management system existing in the information generating apparatus, on the basis of a data string of a file path which depends on the logical file management system; and a process for restoring the file path on the basis of the handle information to uniquely specify each of the plurality of files in the information processing apparatus.

9. A computer-readable storage medium which stores a program according to claim 8.

10. A digital information input system including an information generating apparatus for transferring information of a file to an outside and an information processing apparatus, comprising:

identification information generating means for generating handle information which is independent of a logical file management system existing in said information generating apparatus, by executing a logical calculation of file path information of the file, wherein the file path information depends on the logical file management system; and identification information restoring means for restoring the file path information of the data object on the basis of the handle information.

11. An information generating apparatus for transferring information of a file to an outside, comprising:

identification information generating means for generating handle information which is independent of a logical file management system, by executing a logical calculation of file path information of the file, wherein the file path information depends on the logical file management system; and identification information restoring means for restoring the file path information of the file on the basis of the handle information.

12. An apparatus according to claim 11, further comprising transmitting means for transmitting the handle information to the outside.

13. An apparatus according to claim 12, further comprising receiving means for receiving the handle information from the outside.

14. An apparatus according to claim 13, wherein the handle information is generated so as to include contents for specifying the file and specifying a storing location of the file in the logical file management system.

15. An apparatus according to claim 14, wherein the information generating apparatus is a digital camera or a digital video camera and the file is a plurality of files of image data captured by the digital camera or the digital video camera.

16. An information managing method for a digital information input system including an information generating apparatus for transferring information of a file to an outside and an information processing apparatus, comprising the steps of:

generating handle information which is independent of a logical file management system existing in the information generating apparatus, by executing a logical calculation of file path information of the file, wherein the file path information depends on the logical file management system; and restoring the file path information of the file on the basis of the handle information.

17. A computer-executable program stored in a computer-readable storage medium, comprising a program code causing a computer to control a digital information input system having an information generating apparatus for transferring information of a file to an outside and an information processing apparatus to perform a method of managing information, the method comprising:

a process for generating handle information which is independent of a logical file management system existing in the information generating apparatus, by executing a logical calculation of file path information of the file, wherein the file path information depends on the logical file management system; and a process for restoring the file path information of the file on the basis of the handle information.

18. A computer-readable storage medium which stores a program according to claim 17.

* * * * *